United States Patent
Mansour et al.

(10) Patent No.: US 10,652,915 B1
(45) Date of Patent: May 12, 2020

(54) CODEC-TIME AWARE SCHEDULER FOR VOICE-OVER-IP

(71) Applicant: Sprint Spectrum L.P., Overland Park, KS (US)

(72) Inventors: Nagi A. Mansour, Arlington, VA (US); Akin Ozozlu, Mclean, VA (US); Noman M. Alam, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/182,209

(22) Filed: Nov. 6, 2018

(51) Int. Cl.
*H04W 72/12* (2009.01)
*H04W 72/04* (2009.01)
*H04L 5/14* (2006.01)

(52) U.S. Cl.
CPC .......... *H04W 72/1236* (2013.01); *H04L 5/14* (2013.01); *H04W 72/0446* (2013.01)

(58) Field of Classification Search
CPC .. H04W 72/1236; H04W 72/0446; H04L 5/14
See application file for complete search history.

(56) References Cited

U.S. PATENT DOCUMENTS

| | | | |
|---|---|---|---|
| 10,231,282 B1* | 3/2019 | Lee | H04W 72/0446 |
| 2002/0055360 A1* | 5/2002 | Chen | H04W 16/00 455/452.2 |
| 2011/0211503 A1* | 9/2011 | Che | H04L 5/0005 370/280 |
| 2012/0115433 A1* | 5/2012 | Young | H04L 41/5029 455/406 |
| 2014/0269454 A1* | 9/2014 | Papasakellariou | H04L 5/1469 370/280 |
| 2016/0112992 A1* | 4/2016 | Bhushan | H04L 5/0042 370/330 |
| 2017/0041119 A1* | 2/2017 | Ang | H04L 5/0028 |

* cited by examiner

*Primary Examiner* — Mohammad S Anwar

(57) ABSTRACT

Disclosed are methods and systems for adjusting allocation of uplink (UL) and downlink (DL) air interface resources to user equipment devices (UEs) in a wireless communication system configured for dynamic allocation of relative amounts UL and DL time division duplex (TDD) air interface resources. The wireless communication system may determine usage demand for UL air interface resources relative to DL air interface resources as a function of time of day. Then, based on the usage demand, a schedule may be created for assigning a ratio of UL TDD allocation to DL TDD allocation. Finally, dynamic TDD allocation may be applied to set relative amounts of UL and DL air interface time for UEs served by the wireless communication system according to the schedule, instead of applying unscheduled dynamic TDD allocation of relative amounts of UL and DL air interface time.

18 Claims, 4 Drawing Sheets

CODEC-TIME AWARE SCHEDULER FOR VOICE-OVER-IP

BACKGROUND

A cellular wireless network typically includes a number of base stations or other access nodes, referred to without limitation as Node-Bs (NBs), that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated) can operate. Each NB could be coupled with a core network that provides connectivity with various application servers and/or transport networks, such as the public switched telephone network (PSTN) and/or the Internet for instance. With this arrangement, a UE within coverage of the cellular network could engage in air interface communication with a NB and could thereby communicate via the NB with various application servers and other entities.

Such a network could operate in accordance with a particular radio access technology, with communications from the NBs to UEs defining a downlink or forward link and communications from the UEs to the NBs defining an uplink or reverse link.

In accordance with the radio access technology, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the NBs and UEs.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

Overview

In 4G LTE and 5G NR wireless communication systems, communications from a base station (e.g., a NB) to a UE are carried on a "downlink" or "DL" of an air interface between the UE and base station, and communications from a UE to the base station are carried on an "uplink" or "UL" of the air interface. As noted above, the UL and DL of both types of systems operate on one or more radio frequency (RF) carriers according to FDD or TDD. In the frequency domain, the carriers are subdivided into orthogonal subcarriers for encoding data symbols using orthogonal frequency division multiplexing (OFDM). Under 4G LTE, each subcarrier is 15 kHz wide, while 5G NR currently specifies configurable subcarrier bandwidths of 15, 30, 50, 120, and 240 kHz.

In the time domain, UL and DL transmissions in both 4G LTE and 5G NR are organized according to frames, which are further divided into subframes. In a typical arrangement, each frame is 10 milliseconds (ms) in duration and is made up of 10 1-ms subframes. Each subframe also defines a transmission time interval (TTI), so that each frame can also be characterized as being made up of 10 TTIs. Other configurations are possible as well.

Under 4G LTE, in a common configuration, each subframe is divided into two slots and carries 14 OFDM symbols (seven symbols per slot). Thus, each two-slot subframe carries 14 OFDM symbols. Under 5G NR, each slot carries 14 OFDM symbols, but the slot duration is configurable according to the subcarrier width, so that the number of symbols per subframe is correspondingly configurable. Currently, 5G NR specifies slot durations of 1 ms for 15 kHz subcarriers, 0.5 ms for 30 kHz subcarriers, 0.25 ms for 60 kHz subcarriers, and 0.125 ms for 120 kHz subcarriers. The corresponding number of symbols per subframe is 14, 28, 56, and 112. Each 5G NR slot can be designated exclusively for DL transmission, exclusively for UL transmission, or a mixed UL-DL transmission of either DL data with UL control, or UL data with DL control.

In both 4G LTE and 5G NR systems operating according to TDD, the entire carrier band is dedicated to either DL transmission or UL transmission on a time-multiplexed basis. This is typically achieved by designating certain TTIs of a frame for DL transmission, and certain other TTIs of the frame for UL transmission. The designated numbers of DL and UL TTIs for a given frame are specified according to a frame configuration for the given frame. Each of 4G LTE and 5G NR may define multiple different frame configurations. It is customary to characterize frame configurations according the ratio of the number of DL TTIs to the number of UL TTIs (alternatively, the inverse ratio may be used to characterize frame configuration).

Under 4G LTE, the frame configuration is typically a static system setting that applies to the entire network, or at least on a regional or metropolitan service area level. The configuration is static in the sense that it typically changed only occasionally, and not on a routine operational basis. Having been developed as a coexisting system with 3G predecessors providing service with large (macro) base stations, static frame configurations made sense for 4G LTE systems. In addition, transmissions in 4G LTE systems are synchronous on a system-wide basis, making static frame configuration a factor in avoiding interference. As wireless technologies have advanced, and markets evolved, however, wireless access has come to be provided by a mix of base station types and on a range of coverage area sizes, including small and micro base stations serving small local areas and small numbers of UEs. Static frame configuration does not scale as well with resulting air-interface service model.

Accommodating—and even taking advantage of—the mix of base station types (e.g., macro, mini, and micro) and their frequently overlapping coverage areas has been one of the goals of 5G NR design and development. In particular, 5G NR provides for dynamic TDD, effectively allowing the ratio of DL/UL per frame to be adjusted on the fly. This capability is envisioned to be most beneficial to small base stations that may account for more fine-grained temporal and per-user variations in types of service compared with large or macro base stations. However, adjacent or overlapping service areas may be subject to interference when their instantaneous frame configurations differ due to dynamic TDD. Thus, using dynamic TDD in practice may involve other, possibly complex, operations to mitigate potential interference.

While use of dynamic TDD in a wireless communication system may pose certain implementation challenges, the ability to dynamically adjust the ratio of DL/UL of frames provides a technical mechanism for relaxing strict static frame configurations. As disclosed herein, operational aspects of dynamic TDD may be used for regular or semi-dynamic adjustments of the DL/UL ratio in order to accommodate known and/or anticipated network demands in a controlled fashion. In particular, dynamic TDD capabilities may be implemented based on one or more schedules derived from analysis of data and voice traffic in a wireless communication system. In addition, analysis of data and voice traffic patterns may be used to determine optimal voice encoding schemes as a function of time of day. These may then be used to implement schedule-based vocoder rates. Together, these schedule base adjustments can help improve overall performance and enhance efficiency of service delivery in a wireless communication system.

Hence, in one respect, various embodiments of the present invention provide a method for adjusting allocation of uplink (UL) and downlink (DL) air interface resources to user equipment devices (UEs) in a wireless communication system configured for dynamic allocation of relative amounts UL and DL time division duplex (TDD) air interface resources, the method comprising: determining usage demand for UL air interface resources relative to DL air interface resources as a function of time of day; based on the usage demand, creating a schedule for assigning a ratio of UL TDD allocation to DL TDD allocation; and applying dynamic TDD allocation to set relative amounts of UL and DL air interface time for UEs served by the wireless communication system according to the schedule, instead of applying unscheduled dynamic TDD allocation of relative amounts of UL and DL air interface time.

Hence, another respect, various embodiments of the present invention provide a wireless communication system comprising: one or more base stations configured for serving user equipment devices (UEs) in a given region using at least dynamic allocation of relative amounts UL and DL time division duplex (TDD) air interface resources, wherein the wireless communication system is configured to: determine usage demand for UL air interface resources relative to DL air interface resources as a function of time of day within the given region; and based on the usage demand, create a schedule for assigning a ratio of UL TDD allocation to DL TDD allocation; and wherein the one or more base stations are further configured to apply dynamic TDD allocation to set relative amounts of UL and DL air interface time for UEs served by the wireless communication system according to the schedule, instead of applying unscheduled dynamic TDD allocation of relative amounts of UL and DL air interface time.

In still another respect, various embodiments of the present invention provide a non-transitory computer-readable medium having instructions stored thereon that, when executed by one or more processors of a wireless communication system configured for dynamic allocation of relative amounts UL and DL time division duplex (TDD) air interface resources, cause the wireless communication system to carry out operations including: determining usage demand for UL air interface resources relative to DL air interface resources as a function of time of day; based on the usage demand, creating a schedule for assigning a ratio of UL TDD allocation to DL TDD allocation; and applying dynamic TDD allocation to set relative amounts of UL and DL air interface time for UEs served by the wireless communication system according to the schedule, instead of applying unscheduled dynamic TDD allocation of relative amounts of UL and DL air interface time.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a network that includes both 4G LTE and 5G-NR NBs, and where representative UEs are capable of engaging in EN-DC service (e.g., each having a 4G radio and a 5G radio and being capable of engaging in communication concurrently via those radios). It should be understood, however, that the principles disclosed herein could extend to apply with respect to other scenarios as well, such as with respect to other radio access technologies. Further, it should be understood that other variations from the specific arrangements and processes described are possible. For instance, various described entities, connections, functions, and other elements could be added, omitted, distributed, re-located, re-ordered, combined, or changed in other ways.

In a representative arrangement, a core network with which a NB is connected includes a user-plane subsystem, such as a Serving Gateway (SGW) and Packet Data Network Gateway (PGW), or a User Plane Function (UPF), that provide connectivity with a transport network such as the Internet. Further, the representative core network includes a control-plane subsystem, such as a Mobility Management Entity (MME), or Access and Mobility Management Function (AMF) and Session Management Function (SMF).

Figure 1:
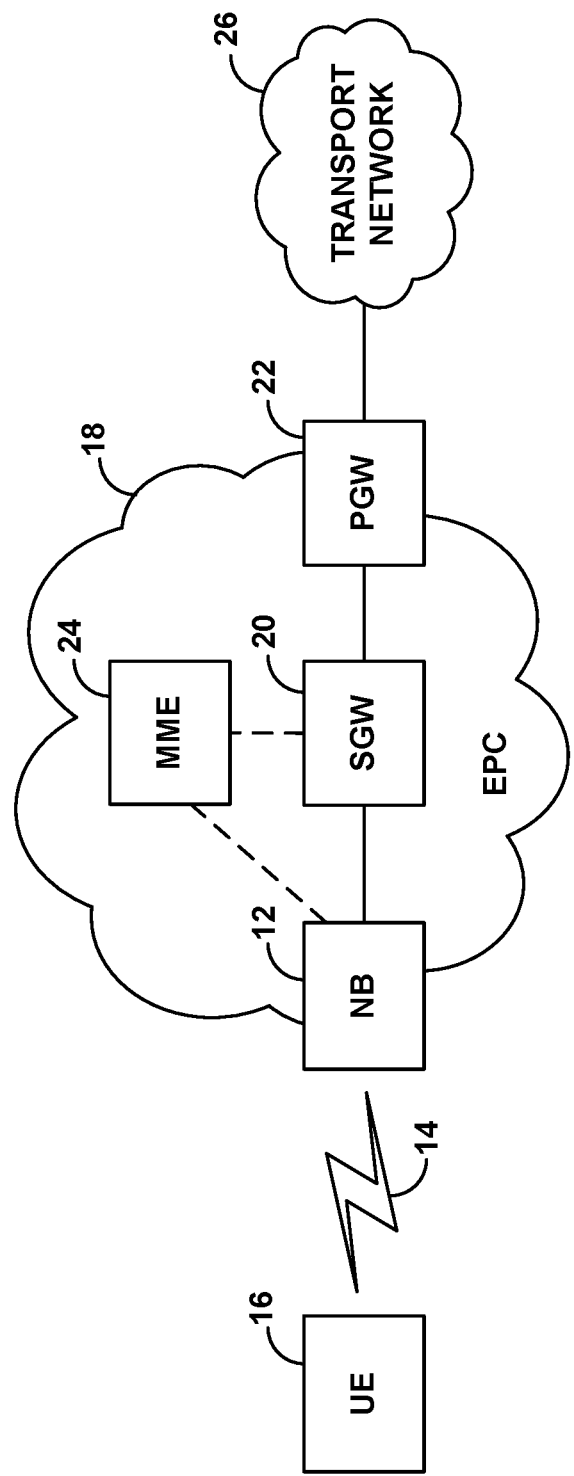
FIG. 1 is a simplified block diagram of an example 4G network arrangement, in accordance with example embodiments.
Figure 2:
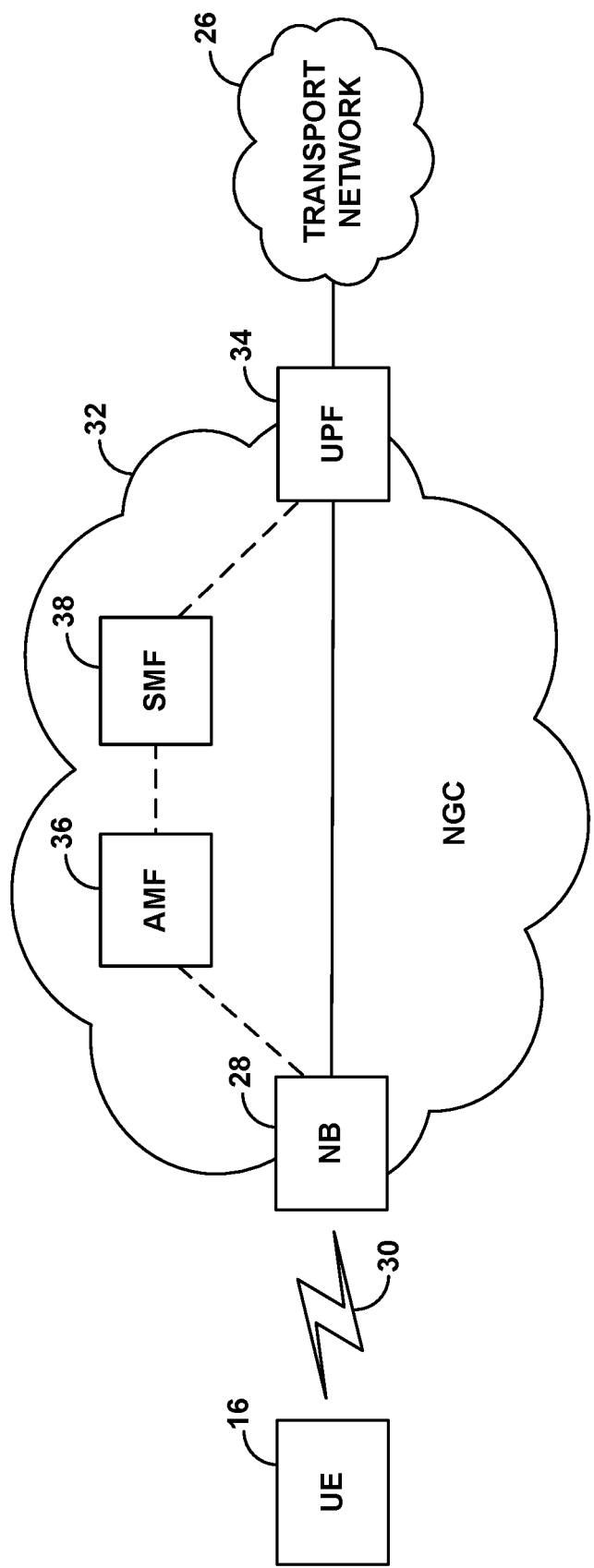
FIG. 2 is a simplified block diagram of an example 5G network arrangement, in accordance with example embodiments.

FIGS. 1 and 2 depict example 4G and 5G networks, each including at least one NB, at least one control-plane node, and at least one user-plane node, and each providing connectivity with a representative transport network such as the Internet.

As shown in FIG. 1, an example 4G network includes a 4G NB (evolved NB (eNB)) 12, which provides a 4G coverage area 14 in which to serve UEs such as a representative UE 16. The 4G NB then sits as a node on an Enhanced Packet Core (EPC) access network 18 including an SGW 20, a PGW 22, and an MME 24. In particular, the 4G NB has an interface with the SGW, the SGW has an interface with the PGW, and the PGW connectivity with a transport network 26. Further, the 4G NB also has an interface with the MME, which also has an interface with the SGW.

In this 4G arrangement, the SGW and PGW operate as user-plane nodes through which user-plane communications (e.g., application-layer user communications) flow between the 4G NB and the transport network. And the MME operates as a control-plane node, responsible for coordinating setup of bearer connections and other control functions.

In line with the discussion above, when UE 16 enters into coverage of the 4G NB, the UE may discover coverage of the 4G NB (e.g., by detecting broadcast from the NB of a synchronization signal at a predefined center frequency of a carrier, and by detecting a threshold strong reference-signal broadcast from the 4G NB). The UE may then engage in access signaling and RRC signaling with the 4G NB to establish a 4G RRC connection defining a logical air interface connection through which the 4G NB will serve the UE. Further, the UE may transmit via its 4G RRC connection to the 4G NB an attach request to trigger registration of the UE for service.

Upon receipt of the UE's attach request, the 4G NB may forward the attach request to the MME, with this and/or other signaling and operations establishing for the UE a control-plane signaling path (e.g., S1-MME) between the 4G NB and the MME. The MME may then coordinate setup for the UE of a user-plane access bearer for carrying packet data between the 4G NB and the SGW. For instance, the MME could engage in bearer-setup signaling with the 4G NB and the SGW to establish for the UE an S1-U tunnel between the 4G NB and the SGW, discovering tunnel endpoint identifier (TEIDs) at the 4G NB and SGW and informing the 4G NB and SGW of each other's TEIDs as endpoints of the S1-U tunnel. Further, the SGW could responsively engage in signaling with the PGW to establish for the UE an S5 tunnel between the SGW and the PGW, the SGW could bridge the UE's S1-U and S5 tunnels together to effectively define for the UE a 4G access bearer extending between the 4G NB and the PGW, and the PGW could assign to the UE an IP address for communication on the transport network.

At this point, the 4G NB could then serve the UE in an RRC connected mode, scheduling downlink air interface communication to the UE of data that passes over the UE's 4G access bearer from the transport network, and scheduling uplink air interface communication of data from the UE, for forwarding over the UE's 4G access bearer to the transport network.

FIG. 2 depicts an example 5G network, including at least one NB, at least one control-plane node, and at least one user-plane node, and providing connectivity with a representative transport network such as the Internet.

As shown in FIG. 2, an example 5G network includes a 5G NB (gigabit NB (gNB)) 28, which provides a 5G coverage area 30 in which to serve UEs such as representative UE 16. The 5G NB then sits as a node on a Next Generation Core (NGC) access network 32 including an UPF 34, AMF 36, an SMF 38. In particular, the 5G NB has an interface with the UPF, and the UPF provides connectivity with transport network 26. Further, the 5G NB also has an interface with the AMF, the AMF has an interface with the SMF, and the SMF has an interface with the UPF.

In this 5G arrangement, the UPF operates as a user-plane node, through which user-plane communications flow between the 5G NB and the transport network. And the AMF and SMF cooperatively define a control-plane subsystem and operate as control-plane nodes, responsible for coordinating setup of bearer connections and other control functions.

With this arrangement, when UE 16 enters into coverage of the 5G NB, the UE may discover coverage of the 5G NB (in a manner similar to that described above). The UE may then engage in access signaling and Radio Resource Control (RRC) signaling with the 5G NB to establish a 5G RRC connection defining a logical air interface connection through which the 5G NB will serve the UE. Further, the UE may transmit via its 5G RRC connection to the 5G NB an attach request to trigger registration of the UE for service.

Upon receipt of the UE's attach request, the 5G NB may forward the attach request to the AMF, and the AMF may send a create-session request to the SMF, with this or other signaling establishing for the UE a control-plane signaling path extending effectively between the 5G NB and the SMF. Further, the SMF may responsively engage in bearer-setup signaling with the UPF and, via the AMF, with the 5G NB, to establish for the UE a tunnel defining a 5G access bearer that extends between the 5G NB and the UPF. For instance, the SMF could discover TEIDs at the 5G NB and UPF and inform the 5G NB and UPF of each other's TEIDs as endpoints of the access bearer. And the UPF may assign to the UE an IP address for communication on the transport network.

At this point, the 5G NB could then likewise serve the UE in an RRC connected mode, scheduling downlink air interface communication to the UE of data that passes over the UE's 5G access bearer from the transport network, and scheduling uplink air interface communication of data from the UE, for forwarding over the UE's 5G access bearer to the transport network.

As described above, under both 4G LTE and 5G NR, transmissions are arranged in the time domain 10 ms frames, each subdivided into 10 1-ms subframes or TTIs. Under 4G LTE, each subframe contains two 0.5 ms slots, each accommodating seven OFDM symbols, for a total of 14 OFDM symbols per TTI. 5G NR also defines slots, but according to current standards, each accommodates 14 OFDM symbols. Further, the slot duration is configurable, from 1 ms down to 0.125 ms in successively halved step sizes. Correspondingly, the number of slots per subframe is configurable from one to eight in successively doubled step sizes, and the number of OFDM symbols per subframe scales as 14 multiplied by the number of slots per subframe.

In 4G LTE operation according to TDD, the entire frequency bandwidth is allocated to the uplink or the downlink on a per-TTI basis, such that a given frame may contain a mix of uplink and downlink TTIs. The mix of UL and DL TTIs in a frame is defined according to a frame configuration that specifies the number and temporal positions within the frame of the DL TTIs and UL TTIs. In typical, conventional operation, the frame configuration is set as a largely static system-wide parameter, though there may be multiple frame configurations defined, and it is possible to occasionally or from time to time change which one is in use, usually as part of operations management procedures.

For any given frame configuration, the ratio of the number of DL TTIs to the number of UL TTIs (or the inverse ratio) corresponds to the amount of time per frame allocated for DL transmission relative to that allocated for UL transmissions (or vice versa for the inverse ratio). Thus, applying the frame configuration on a largely static basis imposes a DL to UL ratio that is correspondingly largely static. As such, tuning the DL to UL ratio according to local and/or temporal operating conditions is generally not done on a routine or regular basis in conventional operation.

In 5G NR operation according to TDD, frame configurations may also be defined according to the ratio of the number of DL TTIs to the number of UL TTIs (or the inverse ratio). However, when multiple slots per TTI are configured, it may also be possible to support a DL to UL ratio within individual TTIs according to a mix of exclusively DL and exclusively UL slots per TTI. Further, 5G NR can also designate a mixed slot option that includes a mix of DL and UL OFDM symbols in a single slot.

One purpose of the flexible slot types in 5G NR is to support dynamic adjustment of the DL to UL ratio. Dynamic adjustment of the DL to UL ratio may allow the system to adapt to more fine-grained service variations that can arise in a heterogeneous network of macro base stations and micro base stations and the correspondingly heterogeneous mix of coverage area sizes, service types, and temporal variations. However, dynamic adjustment may also introduce significant operational challenges relating to interference as a result of sharing the same frequency bandwidth on possibly conflicting UL and DL schedules among different NBs. Solutions for meeting these challenges are still in development. However, the inventors have recognized that the operational mechanisms for dynamic adjustment of the DL to UL ratio can support adapting allocation of DL and UL air interface resources under TDD operation according to known traffic patterns, even if ad hoc or reactive dynamic adjustment is not used.

In accordance with example embodiments, observed or measured traffic patterns representing UL and DL demand as a function of time of day for a given coverage area or region may be used to derive a schedule for adjusting the DL to UL ratio of TDD air interface resources for the given coverage area or region. The operational mechanisms for dynamic adjustment of the DL to UL ratio may be used to adjust the ratio according to the derived schedule. By applying the adjustments over the given coverage area or region, the issues of interference and other operational challenges of ad hoc or reactive dynamic adjustment may be avoided. But the advantages of adapting the DL to UL ratio to known or expected demand may nevertheless be realized. In an example embodiment, the coverage area or region may be a metropolitan area, for example, over which the schedule may have broad and relevant applicability. Other configurations of coverage areas or regions may be used as well.

The inventors have further recognized that while adapting the DL to UL ratio to known or expected demand as represented in a schedule may provide for effective and efficient balancing between DL and UL resources, the capacity of available resources may also be adapted according to demand by adjusting how data are processed in preparation for transmission on the air interface. More specifically, data may be encoded and decoded using a codec (coder/decoder), for compression prior to transmission and decompression upon reception by a receiving device or entity (e.g., NB or UE). Codecs may be characterized by a bit rate, typically measured in kbits per second (kbps). The amount of air interface resources used for a transmission may therefore depend on the codec. The higher the bit rate, the more resources used, and vice versa. Thus, the capacity of an air interface, as measured in the number of connections that may be supported, may increase as the bit rate goes down, and vice versa.

Codecs used for voice calls are referred to as vocoders. By way of example, 3GPP Release 12 defines an Enhanced Voice Services (EVS) codec for OFDM that specifies four bandwidths, each supporting a range of bit rates. Typically, the narrow band (NB) may be used for voice calls, and supports bit rates (in kbps) of 5.9, 7.2, 8, 9.6, 13.2, 16.4, and 24.4. As the bit rate increases, the voice quality also increases, but the call capacity goes down.

In further accordance with example embodiments, observed or measured traffic patterns of voice calls as function of time of day for the given coverage area or region may be used to derive a schedule for adjusting vocoder rate. More particularly, a derived schedule for vocoder rate may specify a lower bit rate for times when expected demand is higher, and a higher bit rate for times when the expected demand is lower. In this way, call capacity may be increased during times of high demand, and vice versa.

By applying a schedule to both adjustment of the DL to UL ratio and the vocoder rate, example embodiments provide for intelligent and efficient tuning of air interface resources to expected or known demand for air interface resources within the coverage area or region over which the schedule was derived. Further, by utilizing the capabilities of 5G NR for dynamic adjustment of the DL to UL ratio, implementation of schedule-based adjustment may be streamlined. It will be appreciated that 4G LTE may also be modified to support schedule-base adjustment of frame configuration in order to similarly achieve adjustment of the DL to UL ratio. Specifically, multiple frame configurations could be defined according to desired DL to UL ratios for time intervals specified in the schedule, and modified operation of 4G LTE could be used to select among the frame configurations according to the schedule.

Also in accordance with example embodiments, a schedule could be derived for the DL to UL ratios by analyzing historical records of usage metrics of a wireless communication system. For example, records of DL and UL demand in terms of schedule volumes of data in each direction could obtained from NBs in a given coverage area. Then, histogramming of the historical usage metrics across time of day could be used to derive time boundaries that characterize temporal usage patterns. An example analysis might reveal busy periods during weekday rush hours in the morning and evening, and one or more differing levels of demand for DL and UL air interface resources and one or more other times of day. A schedule may then be derived or defined to reflect the empirically-determined intervals.

In accordance with example embodiments, a similar measurement and analysis process may be used to derive a schedule for vocoder rate, based on the recorded number of call across times of day. The schedule for DL to UL ratio could be the same or different than that derived for vocoder rate. If the two schedules have the same time intervals, then a single schedule could be applied to both adjustment of DL to UL ratio and vocoder rate. If the two schedules are different, then DL to UL ratio and vocoder rate could each be adjust according to a respective schedule.

An example schedule may be used to illustrated operation according to example embodiments. Analysis of historical traffic patterns in a given metropolitan area might yield a schedule with four different weekday time periods that apply to both DL to UL ratio and vocoder rate. By way of example, during a time period from 6:30 am to 10:00 am, the ratio of DL to UL demand might peak at 90%, and voice calls may similarly peak at 90% capacity utilization in terms of number of calls using a 24.4 kbps vocoder. A similar demand pattern might be observed or derived from historical usage records of a time period from 4:00 pm to 7:00 pm. Continuing with the example, during the period between 10:00 am and 4:00 pm, the ratio of DL to UL demand might peak at 65%, and voice calls may peak at 50% capacity utilization in terms of number of calls using a 24.4 kbps vocoder. And during the period between 7:00 pm and 6:30 am, the ratio of DL to UL demand might peak at 80%, and voice calls may peak at 65% capacity utilization in terms of number of calls using a 24.4 kbps vocoder.

Table 1 shows an example schedule that might derived from the above example observations of historical usage analyses.

TABLE 1

| Time Period | DL to UL Ratio (%) | Vocoder Rate (kbps) |
|---|---|---|
| 6:30 am-10:00 am | 90 | 9.6 |
| 10:00 am-4:00 pm | 70 | 24.4 |
| 4:00 pm-7:00 pm | 90 | 7.2 |
| 7:00 pm-6:30 am | 85 | 24.4 |

The two columns that list the UL to DL ratios and vocoder rates may then specify the ratios and rates that are applied during the associated time periods. Advantageously, by applying the scheduled ratios and rates, system performance and user experience may be improved over the otherwise static settings for these parameters. At the same time, the utilization of the dynamic adjustment capabilities of 5G NR may enable this advantageous operation to be implemented simply and efficiently. Further, by using a schedule instead of reactive or ad hoc use of dynamic adjustment, the problems and challenges of dynamic adjustment in TDD operation may be avoided.

It will be appreciated that the schedule illustrated in Table 1 is just one example of a usage demand table, and that other tables with more or fewer time intervals and/or different parameter settings for DL to UL ratio and/or vocoder rate could be derived and used.

Figure 3:
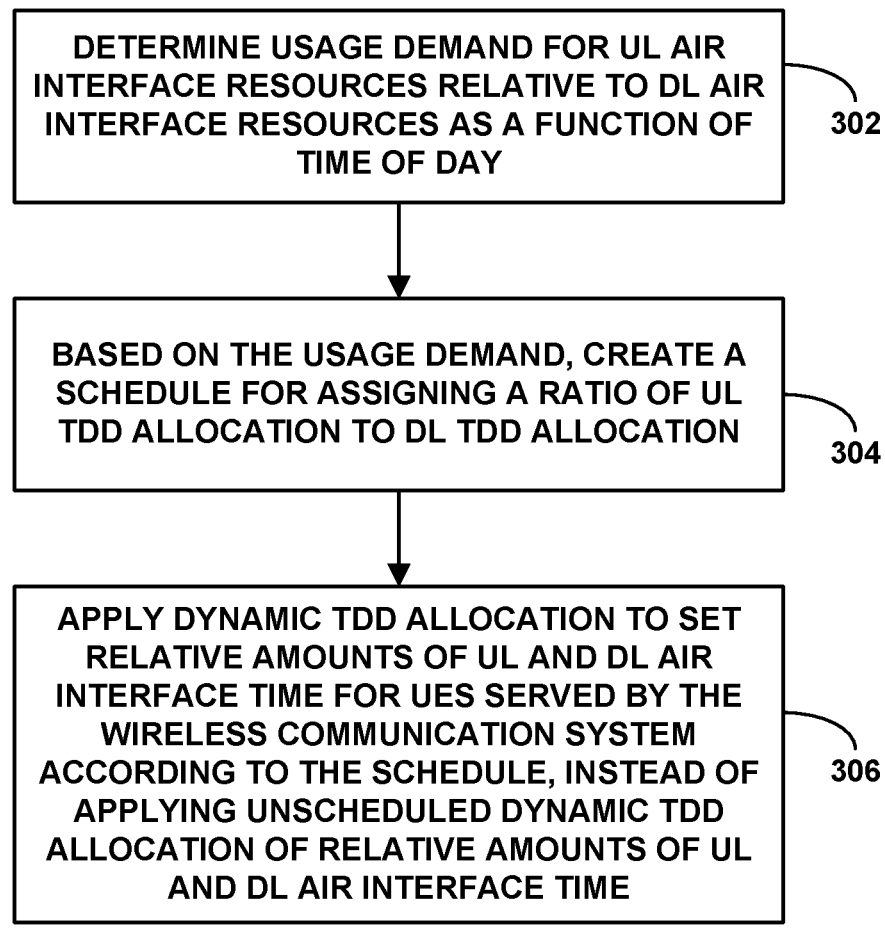
FIG. 3 is a flow chart depicting an example method, in accordance with example embodiments.

FIG. 3 is a flow chart depicting a method that can be carried out in accordance with the present disclosure for adjusting allocation of uplink (UL) and downlink (DL) air interface resources to user equipment devices (UEs) in a wireless communication system configured for dynamic allocation of relative amounts UL and DL time division duplex (TDD) air interface resources. This method could be carried out by a wireless service provider that makes use of multiple NBs and a core network as described above for instance, or the method could be carried out specifically by one or more entities of such a wireless communication system, or by one or more other entities.

The example method could be implemented as machine language instructions (e.g., program code) that, when carried out by one or more processors of a wireless communication system, cause the wireless communication system to carry out the various operations of the method. The example method may also be stored as machine language instructions on a non-transitory computer-readable medium, from which the instructions may be transferred to computer memory for execution, or accessed directly by one or more processors for executions as described above.

At block 302, the example method may involve determining usage demand for UL air interface resources relative to DL air interface resources as a function of time of day.

At block 304, the example method may involve creating a schedule for assigning a ratio of UL TDD allocation to DL TDD allocation, based on the usage demand.

Finally, at block 306, the example method may involve applying dynamic TDD allocation to set relative amounts of UL and DL air interface time for UEs served by the wireless communication system according to the schedule. In particular, applying dynamic TDD allocation according to the schedule may be done instead of applying unscheduled dynamic TDD allocation of relative amounts of UL and DL air interface time, such as reactive or ad hoc dynamic TDD allocation.

In accordance with example embodiments, the example method may further entail adjusting a vocoder rate according to the schedule.

In accordance with example embodiments, determining the usage demand for UL air interface resources relative to DL air interface resources as a function of time of day may entail analyzing voice and data traffic patterns as a function to time of day in the wireless communication system. More particularly historical usage metrics of the wireless communication system may be analyzed, and then the historical usage metrics across two or more daily time intervals may be binned or histogrammed.

In example embodiments, UL and DL TDD air interface resources may be allocated in units of transmission time intervals (TTIs) within fixed transmission time frames. As such, creating the schedule for assigning a ratio of UL TDD allocation to DL TDD allocation based on the usage demand may entail determining the ratio of UL TDD allocation to DL TDD allocation for each given daily time interval of the two or more daily time intervals according to the historical usage metrics in the given daily time interval. A relative number of UL and DL TTIs may thus be set within each fixed transmission time frame in each given daily time interval according to the determined ratio in the given daily time interval.

In further accordance with example embodiments, applying dynamic TDD allocation to set the relative amounts of UL and DL air interface time for UEs served by the wireless communication system according to the schedule, instead of applying unscheduled dynamic TDD allocation of relative amounts of UL and DL air interface time, may entail applying dynamic TDD allocation to allocate the relative numbers of TTIs for UL and DL transmissions within each of the fixed transmission time frames according to the schedule. For example, UL TTIs and DL TTIs may be dynamically allocated according to a number ratio in proportion to a ratio of UL traffic demand to DL traffic demand. As such adjusting the vocoder rate according to the schedule may entail decreasing the vocoder rate in inverse proportion to increasing voice traffic load.

In accordance with example embodiments, determining the usage demand for UL air interface resources relative to DL air interface resources as a function of time of day may entail measuring voice and data traffic patterns over a given region served by the wireless communication system. More particularly, the wireless communication system may include one or more base stations serving the given region. In this arrangement, applying dynamic TDD allocation to set the relative amounts of UL and DL air interface time for UEs served by the wireless communication system according to the schedule, instead of applying unscheduled dynamic TDD allocation of relative amounts of UL and DL air interface time, may entail instructing the one or more base stations to schedule UL and DL air interface transmissions using the relative amounts of UL and DL air interface time allocated according to the schedule.

In accordance with example embodiments, the wireless communication system is configured to operate according at least to 5G NR standards. It will be appreciated that the example method could be implemented for other forms of wireless communication systems, including ones configured to operate according to 4G LTE, for example.

Figure 4:
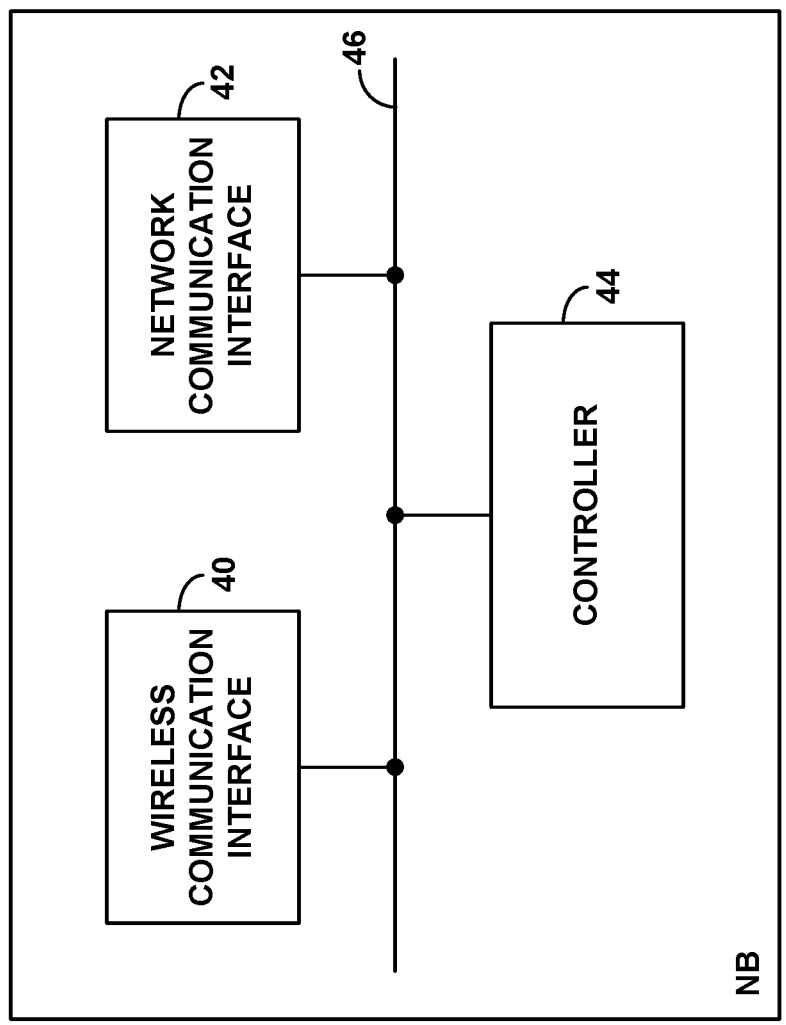
FIG. 4 is a simplified block diagram of a NB operable in accordance with example embodiments.

Finally, FIG. 4 is a simplified block diagram an example NB that could be operable in accordance with the present disclosure. As shown, the example NB includes a wireless communication interface 40, a network communication interface 42, and a controller 44, all of which may be communicatively linked together by a system bus, network, or other connection mechanism 46.

In this arrangement, the wireless communication interface 40 could be configured to provide cellular coverage and to provide air-interface service, engaging in air interface communication with served UEs. As such, wireless communication interface 40 could comprise an antenna structure, which may be tower mounted or may take other forms, and associated components such as a power amplifier and a wireless transceiver, so as to facilitate providing a coverage area defining an air interface having a downlink and an uplink, and engaging in transmission and reception of bearer and control data over the air interface in accordance with an air interface protocol such as any of those noted above. Further, network communication interface 42 could comprise a wired or wireless interface, such as an Ethernet network communication interface, configured to support communication with other entities, such as entities on an EPC and/or entities on an NGC for instance.

Controller 44 could then comprise control logic to cause the NB to carry out particular operations including those discussed above. As such, the controller 44 could take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding, storing, encoded with, or otherwise embodying or having program instructions executable by the processing unit to cause the NB to carry out various operations described herein. It should also be understood that the present disclosure contemplates a non-transitory computer readable medium having encoded thereon program instructions executable to carry out such operations as well.

Exemplary embodiments have been described above. Those skilled in the art will understand, however, that changes and modifications may be made to these embodiments without departing from the true scope and spirit of the invention.

We claim:

1. A method for adjusting allocation of uplink (UL) and downlink (DL) air interface resources to user equipment devices (UEs) in a wireless communication system configured for dynamic allocation of relative amounts UL and DL time division duplex (TDD) air interface resources, the method comprising:
   determining usage demand for UL air interface resources relative to DL air interface resources as a function of time of day;
   determining voice traffic load in the wireless communication system as a function of the time of day;
   based on the usage demand and on the determined voice traffic load as a function of time of day, creating a schedule both for assigning a ratio of UL TDD allocation to DL TDD allocation, and for assigning a vocoder rate;
   applying dynamic TDD allocation to set relative amounts of UL and DL air interface time for UEs served by the wireless communication system according to the schedule, instead of applying unscheduled dynamic TDD allocation of relative amounts of UL and DL air interface time; and
   adjusting the vocoder rate according to the schedule.

2. The method of claim 1, wherein determining the usage demand for UL air interface resources relative to DL air interface resources as a function of time of day comprises:
   analyzing historical usage metrics of the wireless communication system; and
   histogramming the historical usage metrics across two or more daily time intervals.

3. The method of claim 2, wherein UL and DL TDD air interface resources are allocated in units of transmission time intervals (TTIs) within fixed transmission time frames, and wherein creating the schedule for assigning a ratio of UL TDD allocation to DL TDD allocation based on the usage demand comprises:
   determining the ratio of UL TDD allocation to DL TDD allocation for each given daily time interval of the two or more daily time intervals according to the historical usage metrics in the given daily time interval; and
   setting a relative number of UL and DL TTIs within each fixed transmission time frame in each given daily time interval according to the determined ratio in the given daily time interval.

4. The method of claim 1, wherein determining the voice traffic load in the wireless communication system as a function of the time of day comprises:
   analyzing voice and data traffic patterns as a function to time of day in the wireless communication system.

5. The method of claim 4, wherein UL and DL TDD air interface resources are allocated in units of transmission time intervals (TTIs) within fixed transmission time frames, and wherein applying dynamic TDD allocation to set the relative amounts of UL and DL air interface time for UEs served by the wireless communication system according to the schedule, instead of applying unscheduled dynamic TDD allocation of relative amounts of UL and DL air interface time, comprises applying dynamic TDD allocation to allocate the relative numbers of TTIs for UL and DL transmissions within each of the fixed transmission time frames according to the schedule.

6. The method of claim 5, wherein applying dynamic TDD allocation to allocate the relative numbers of TTIs for UL and DL transmissions within each of the fixed transmission time frames according to the schedule comprises dynamically allocating UL TTIs and DL TTIs according to a number ratio in proportion to a ratio of UL traffic demand to DL traffic demand,
   and wherein adjusting the vocoder rate according to the schedule comprises decreasing the vocoder rate in inverse proportion to increasing voice traffic load.

7. The method of claim 1, wherein determining the voice traffic load in the wireless communication system as a function of the time of day comprises measuring voice and data traffic patterns over a given region served by the wireless communication system.

8. The method of claim 7, wherein the wireless communication system comprises one or more base stations serving the given region,
   and wherein applying dynamic TDD allocation to set the relative amounts of UL and DL air interface time for UEs served by the wireless communication system according to the schedule, instead of applying unscheduled dynamic TDD allocation of relative amounts of UL and DL air interface time, comprises instructing the one or more base stations to schedule UL and DL air interface transmissions using the relative amounts of UL and DL air interface time allocated according to the schedule.

9. The method of claim 1, wherein the wireless communication system is configured to operate according at least to 5G NR standards.

10. A wireless communication system comprising:
one or more base stations configured for serving user equipment devices (UEs) in a given region using at least dynamic allocation of relative amounts UL and DL time division duplex (TDD) air interface resources,
wherein the wireless communication system is configured to:
determine usage demand for UL air interface resources relative to DL air interface resources as a function of time of day within the given region; and
determine voice traffic load in the wireless communication system as a function of the time of day;
based on the usage demand and on the determined voice traffic load as a function of time of day, create a schedule both for assigning a ratio of UL TDD allocation to DL TDD allocation, and for assigning a vocoder rate;
and wherein the one or more base stations are further configured to (i) apply dynamic TDD allocation to set relative amounts of UL and DL air interface time for UEs served by the wireless communication system according to the schedule, instead of applying unscheduled dynamic TDD allocation of relative amounts of UL and DL air interface time, and (ii) adjust the vocoder rate according to the schedule.

11. The wireless communication system of claim 10, wherein determining the usage demand for UL air interface resources relative to DL air interface resources as a function of time of day comprises:
analyzing historical usage metrics of the wireless communication system within the given region; and
histogramming the historical usage metrics across two or more daily time intervals.

12. The wireless communication system of claim 11, wherein UL and DL TDD air interface resources are allocated in units of transmission time intervals (TTIs) within fixed transmission time frames,
and wherein creating the schedule for assigning a ratio of UL TDD allocation to DL TDD allocation based on the usage demand comprises:
determining the ratio of UL TDD allocation to DL TDD allocation for each given daily time interval of the two or more daily time intervals according to the historical usage metrics in the given daily time interval; and
setting a relative number of UL and DL TTIs within each fixed transmission time frame in each given daily time interval according to the determined ratio in the given daily time interval.

13. The wireless communication system of claim 10, wherein determining the voice traffic load in the wireless communication system as a function of the time of day comprises:
analyzing voice and data traffic patterns as a function to time of day in the wireless communication system.

14. The wireless communication system of claim 13, wherein UL and DL TDD air interface resources are allocated in units of transmission time intervals (TTIs) within fixed transmission time frames,
and wherein applying dynamic TDD allocation to set the relative amounts of UL and DL air interface time for UEs served by the wireless communication system according to the schedule, instead of applying unscheduled dynamic TDD allocation of relative amounts of UL and DL air interface time, comprises applying dynamic TDD allocation to allocate the relative numbers of TTIs for UL and DL transmissions within each of the fixed transmission time frames according to the schedule.

15. The wireless communication system of claim 14, wherein applying dynamic TDD allocation to allocate the relative numbers of TTIs for UL and DL transmissions within each of the fixed transmission time frames according to the schedule comprises allocating UL TTIs and DL TTIs according to a number ratio in proportion to a ratio of UL traffic demand to DL traffic demand,
and wherein adjusting the vocoder rate according to the schedule comprises decreasing the vocoder rate in proportion to increasing voice traffic load.

16. The wireless communication system of claim 10, wherein determining the voice traffic load in the wireless communication system as a function of the time of day comprises measuring voice and data traffic patterns over the given region served by the wireless communication system.

17. The wireless communication system of claim 10, wherein the wireless communication system is further configured to operate according at least to 5G NR standards.

18. A non-transitory computer-readable medium having instructions stored thereon that, when executed by one or more processors of a wireless communication system configured for dynamic allocation of relative amounts UL and DL time division duplex (TDD) air interface resources, cause the wireless communication system to carry out operations including:
determining usage demand for UL air interface resources relative to DL air interface resources as a function of time of day;
determining voice traffic load in the wireless communication system as a function of the time of day;
based on the usage demand and on the determined voice traffic load as a function of time of day, creating a schedule both for assigning a ratio of UL TDD allocation to DL TDD allocation and for assigning a vocoder rate;
applying dynamic TDD allocation to set relative amounts of UL and DL air interface time for UEs served by the wireless communication system according to the schedule, instead of applying unscheduled dynamic TDD allocation of relative amounts of UL and DL air interface time; and
adjusting the vocoder rate according to the schedule.

* * * * *